Aug. 25, 1959 — B. STERNLICHT — 2,901,297

BEARINGS

Filed July 16, 1956 — 2 Sheets-Sheet 1

Inventor
Beno Sternlicht
by Morton D. Moore
His Attorney

Aug. 25, 1959  B. STERNLICHT  2,901,297
BEARINGS
Filed July 16, 1956  2 Sheets-Sheet 2
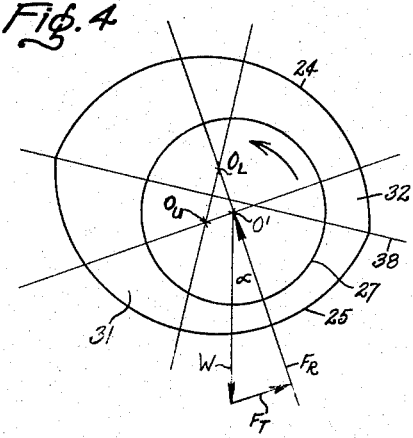
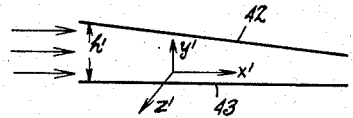
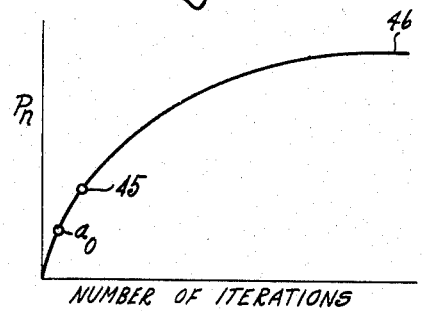
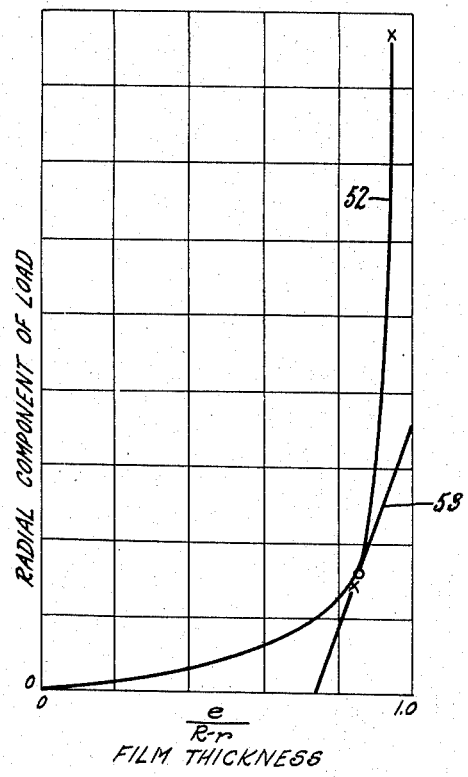
Inventor
Beno Sternlicht
by Merton D Morse
His Attorney

United States Patent Office 2,901,297
Patented Aug. 25, 1959

2,901,297

BEARINGS

Beno Sternlicht, Schenectady, N.Y., assignor to General Electric Company, a corporation of New York Application July 16, 1956, Serial No. 598,059

7 Claims. (Cl. 308—121)

My invention relates to bearings, and particularly to journal bearings for both horizontal and vertical shafts.

It has for one of its objects to reduce the half frequency whirl and resonant whip that occurs in such bearings and is initiated by the lubrication media in the bearing.

A further object of my invention is to provide a bearing of such design as to increase the restoring forces developed in the lubricating film tending to maintain the center of the shaft concentric with the center of the bearing and to reduce the forces tending to produce whirling or whipping of the shaft center about the bearing center.

A further object of my invention is to provide a bearing of such design as to increase forces tending to damp any whirling action of the shaft and to increase the threshold of whirl frequency above the operating rate of rotation of the shaft.

Still a further object of my invention is to obtain these results without reducing the minimum lubricating film thickness between the bearing and the journal (shaft).

Hydrodynamic pressures are developed in the lubricant as a result of eccentricity and journal velocity. This eccentricity produces in cylindrical bearings a converging area, and in the elliptical bearings two converging areas, in the clearance space between the journal and the bearing in which high pressures are developed due to rotation of the journal. These pressures may be resolved into a radial component of force extending in a direction through the bearing and journal centers and a tangential component at right angles thereto. This latter component of force may be considered as a force through the center of the journal at right angles to the radial force and tending to push the journal center around the center of the bearing. This latter force causes the journal center to whirl about the center of the bearing. Such action is likely to result in damage to the bearing and in excessive vibrations of the system.

In elliptical bearings, the forces developed in one of the two converging areas oppose those developed in the other and thus reduce the tendency to whirl and, in some situations, may eliminate the whirl.

Another object of my invention is to improve the stability of operation of elliptical bearings.

This may effected in some situations involving elliptical bearings by inclining the axis of the ellipse to the horizontal, thereby so to relate the opposing forces in the two converging areas as to eliminate the tendency to whirl. In other situations, in accord with my invention, the desired action is obtained by properly grooving the bearing surface axially in the converging areas, thereby reducing the lubricating film pressure in those areas. In this way, the desired stable action of the bearing may be obtained. This means is effective in both cylindrical and elliptical bearings.

The novel features which I believe to be characteristic of my invention are set forth with particularity in the appended claims. My invention itself, however, may best be understood by reference to the following description taken in connection with the accompanying drawings in which:

Fig. 4 represents an elliptical bearing in which the axis of symmetry of the bearing is inclined to the horizontal sufficiently to produce the results of my invention;

Fig. 6 is an explanatory figure relating to fluid flow in converging areas;

Fig. 7 relates pressure at any point to number of interations in calculations relating to my invention, and Fig. 8 is a graph showing certain relationships between the radial component of force and film thickness and eccentricity ratio.

Figure 1:
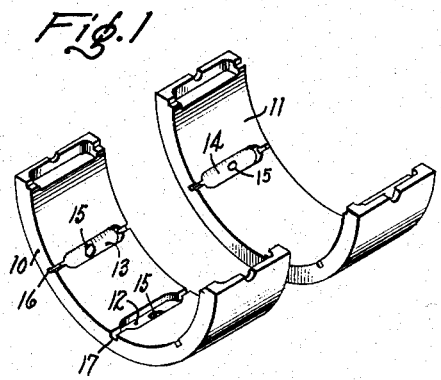
Fig. 1 illustrates an axially grooved bearing constructed in accord with my invention.

Referring to Fig. 1, I have illustrated therein at 10 and 11 the two halves of an elliptical bearing having axial grooves 12, 13, and 14 arranged at regions of the bearing where oil pressures develop which produce the undesired whirling action. These grooves properly designed and located in accord with my invention sufficiently change the pressure profile in the bearing to eliminate the undesired whirl without loss in the minimum film thickness of the lubricant between the bearing and the journal. In Fig. 1, these grooves are each provided with an opening 15 through which oil is supplied to the grooves and from which it flows out over the entire bearing surface and through the ends or chamfers of the groove as at 16 and 17.

Figure 2:
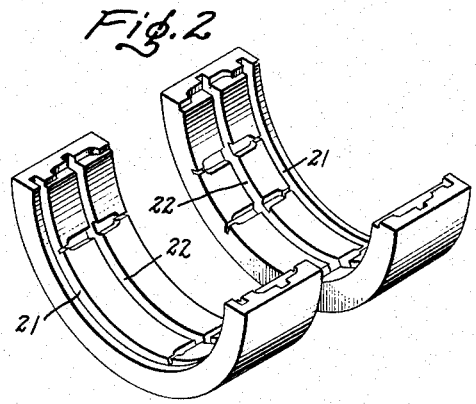
Fig. 2 shows a similar bearing in which the axial grooves are connected by a circumferential groove to accommodate the flow of lubricant between the grooves.

Fig. 2 shows a similar bearing with somewhat different arrangement of grooves and in which the axial grooves are connected by circumferential grooves 21 and 22 to accommodate more free flow of oil between and into the grooves. This provides additional cooling.

Figure 3:
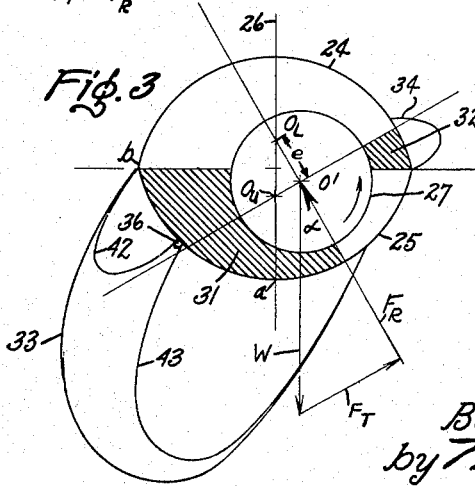
Fig. 3 is an explanatory figure illustrating the effect of grooving in an elliptical bearing.

Fig. 3 is an explanatory diagram to illustrate in an exaggerated way, the action of an elliptical bearing in accord with my invention. In Fig. 3 is illustrated an elliptical bearing made up of an upper cylindrical bearing sector 24 and a lower cylindrical bearing sector 25. The centers of these cylinders are indicated at $O_U$ and $O_L$, respectively, and are displaced from each other on a vertical line 26.

I refer to such bearings as elliptical even though the inner contour is not precisely an ellipse. Were the contour of the bearing surface a true ellipse, the center $O_L$ would be that point that is equidistant from the remote ends $a$ and $b$ of axes of the bearing.

The journal is indicated at 27 as having a center $O'$. Normally, in an unloaded condition of the bearing, this center $O'$ lies on line 26 midway between the centers $O_L$ and $O_U$. However, when operating under load represented by the force vector W, it takes a position such as that shown due to rotation of the journal. Two converging regions in the flow of oil about the bearing are then produced, one being indicated by the shaded area 31 and the other by the shaded area 32; it being assumed that the rotation of the journal is in the direction of the arrow shown. High pressures are developed in these regions, as represented by the curves 33 and 34. These pressures result in forces effective at the center $O'$ and which are represented by the vectors $F_R$ and $F_T$.

The vector $F_T$ is tangential to the journal and may be considered a force at the center $O'$, at right angles to vector $F_R$, tending to whirl the journal center $O'$ around the bearing center and to increase the eccentricity between the bearing and journal. The force $F_R$ is in the direction of centers $O_L$ and $O'$ and is an elastic force tending to support the bearing and to maintain the thickness of the oil film between the bearing and journal. This force is the one that influences the critical frequencies of the system; i.e., the rates of rotation at which maxima of amplitude of vibration occur.

It is desired to maintain the force $F_R$ as great as possible and the force $F_T$ as small as possible for any load W on the bearing. The fact that the bearing is elliptical, and, therefore, has the second converging area 32 in which forces develop tending to oppose those produced in area 31, tends in this direction as compared with corresponding forces in a cylindrical bearing.

The situation represented in Fig. 3 may be improved, in accord with my invention, by producing an axial groove in the bearing 25, as indicated at 36. The curve representing the pressure contour in the converging area 31 may then be represented by the two curves 42 and 43. The pressure in the converging area is now reduced by the difference represented by the area between curve 33 and curves 42 and 43. This results in further reduction of force $F_T$, reduction in attitude angle $\alpha$, and a relative increase in force $F_R$. The forces then produce increased damping of any whirling action of the shaft. The grooving is so located as to shift the eccentricity locus to produce maximum load carrying capacity and not reduce the minimum film thickness.

It will, of course, be understood that various arrangements may be employed. For example, a small groove in a higher pressure region of area 31 may be as effective as a larger groove in the lower pressure area of this region, or a combination of grooves may be employed. The determination of the best arrangements is based on solutions of the well known Reynolds and Energy equations, which establish for a specific geometry the function of $F_R$ and $F_T$ vs. minimum film thickness. Since these forces are dependent on the boundary conditions, considerable trial and error is involved in obtaining the optimum stability. Thus, experience is required to obtain the best arrangement, location, and proportion of grooves.

Fig. 4 represents an elliptical bearing having cylindrical sectors 24 and 25, as in Fig. 3, having centers at $O_U$ and $O_L$, respectively, but in which the axis 38 of the ellipse is inclined at an angle to the horizontal. The journal is shown as having its center $O'$ displaced from the direction of the load W by an attitude angle $\alpha$ due to forces in the converging areas 31 and 32 of the bearing. However, due to the inclination of the axis from the horizontal, the stabilizing forces in areas 31 and 32 are increased with the desirable result of greater stability of the journal and less tendency to whirl.

Figure 5:
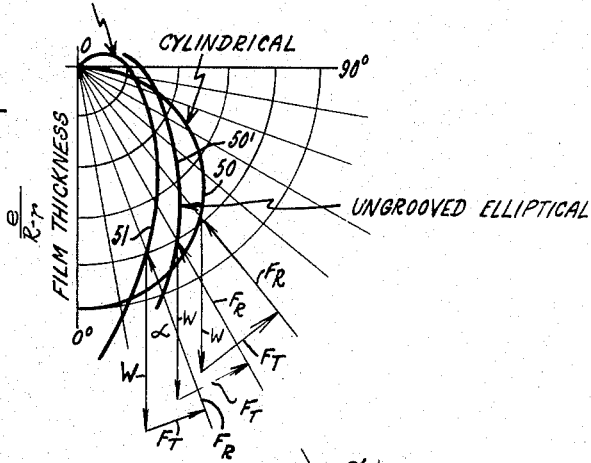
Fig. 5 shows certain relationships between the operation of cylindrical and elliptical bearings.

Fig. 5 represents the advantages of my invention over the conventional cylindrical bearing. In Fig. 5, the point O may be taken to represent the center of the bearing. The radial lines extending from point O represent different attitude angles for different loads. The vertical and horizontal lines may be calibrated in terms of the eccentricity ratio $e/R-r$ where $e$ is the distance between the center of the bearing and the center of the journal, as indicated at $e$ in Fig. 3, R represents the radius of the bearing, and $r$ represents the radius of the journal. In other words, when $e$ is zero, the centers of the bearing and journal are coincident and the oil film thickness $R-r$ is maximum. When $e$ equals $R-r$, the journal and bearing surfaces are in contact and the oil film thickness is zero. This is an intolerable situation which results in damage to or destruction of the bearing. The arcuate lines thus also represent different oil film thicknesses.

The curve 50 represents the eccentricity locus of the journal in an ungrooved cylindrical bearing under varying loads W. Curve 50' represents the eccentricity locus of the journal in an ungrooved elliptical bearing under varying loads. The curve 51 represents the locus of eccentricity of the journal in an elliptical bearing properly grooved in accord with my invention under varying loads W.

From these curves it may be seen that for any given load W, the attitude angle is much smaller in the elliptical bearing grooved in accord with my invention than in the ungrooved cylindrical or elliptical bearing. Thus, the tangential force $F_T$ is much smaller and the restoring force $F_R$ much greater, while the film thickness remains substantially the same.

These results may be calculated from the well known Reynolds' equation for two dimensional flow which includes side leakage.

If we assume flow between two surfaces, as indicated at 42 and 43 in Fig. 6, where $h'$ represents film thickness at any point, $x'$ represents the coordinate in the direction of flow, and $z'$ represents the width coordinate, then the Reynolds' equation may be written as follows:

$$\frac{\partial}{\partial x^1}\left(\frac{h'^3 \partial P^1}{\mu_1 \partial x^1}\right)+\frac{\partial}{\partial z^1}\left(\frac{h'^3}{\mu'}\frac{\partial P'}{\partial z'}\right)=\frac{6U\partial h'}{\Delta x^1} \quad (1)$$

where $P'$ is pressure in the film at any point, $\mu'$ is viscosity of the oil, and U is relative velocity between upper and lower surfaces. (The Theory of Film Lubrication by R. O. Boswall, Longmans, Green and Co., New York, 1928, page 28.)

Neglecting curvature, the film thickness $h'$ in a bearing such as that shown in Fig. 3 may be expressed as follows:

$$h'=\frac{c}{2}+e\cos(\theta-\alpha) \quad (2)$$

where $c$ equals diametral clearance between bearing and journal, $e$ equals eccentricity, $\alpha$ equals attitude angle, and $\theta$ equals radial angle between vertical load and point of film thickness expressed.

In order to express Reynolds' equation in dimensionless form, the following dimensionless quantities may be defined:

$$X=\frac{X'}{D} \quad (3)$$

$$Z=\frac{Z'}{L} \quad (4)$$

$$h=\frac{h'}{c} \quad (5)$$

$$P=\frac{P'}{\mu_{av}}N\left(\frac{C}{D}\right)^2 \quad (6)$$

$$\mu=\frac{\mu'}{\mu_{av}} \quad (7)$$

$$U=\pi DN \quad (8)$$

where X, Z, h, P, and $\mu$ are dimensionless quantities, D equals diameter of bearing, L equals length of bearing, N equals speed of the journal, and $\mu_{av}$ equals average viscosity of the oil.

Substituting (3), (4), (5), (6), (7), and (8) in Equation 1 Reynolds' equation may be written in the following dimensionless form:

$$\frac{\partial}{\partial x}\left(\frac{h^3}{\mu}\frac{\partial P}{\partial x}\right)+\left(\frac{D}{L}\right)^2\frac{\partial}{\partial z}\left(\frac{h^3}{\mu}\frac{\partial P}{\partial z}\right)=6\pi\frac{\partial h}{\partial z} \quad (9)$$

This equation may be solved by the method of finite increments.

If we let $P_n$ represent the pressure at any point on the surface of the bearing and the letters $P_T$ and $P_B$ represent pressure at points spaced equally and oppositely therefrom circumferentially of the bearing by the distance $\Delta X$; and let $P_L$ and $P_R$ represent pressures at points spaced equally and oppositely therefrom axially of the bearing by the distance $\Delta Z$; and let $h_T$, $h_B$, $h_R$, and $h_L$ represent film thickness at the points designated by the sub scripts, then the following difference equations may be written:

$$\frac{\partial}{\partial X}\left(\frac{h^3}{\mu}\frac{\partial P}{\partial X}\right) = \frac{\frac{h_R^3}{\mu_R}\left(\frac{P_R - P_n}{\Delta X}\right) - \frac{h_L^3}{\mu_L}\left(\frac{P_n + P_L}{\Delta X}\right)}{\Delta X} \quad (10)$$

$$\frac{\partial}{\partial Z}\left(\frac{h^3}{\mu}\frac{\partial P}{\partial Z}\right) = \frac{\frac{h_T^3}{\mu_T}\left(\frac{P_T - P_n}{\Delta Z}\right) - \frac{h_B^3}{\mu_B}\left(\frac{P_n - P_B}{\Delta Z}\right)}{\Delta Z} \quad (11)$$

$$\frac{\partial h}{\partial X} = \frac{h_R - h_L}{\Delta X} \quad (12)$$

Substituting (10), (11), and (12) into Equation 9 and rearranging terms, the following expression is obtained for the dimensionless pressure $P_n$:

$$P_n = \frac{6\pi\left(\frac{h_L - h_R}{\Delta X}\right) + \left(\frac{D}{L}\right)^2 \frac{h_T^3}{\mu_R \Delta Z^2} P_T + \frac{h_R^3}{\mu_R \Delta X^2}P_R + \left(\frac{D}{L}\right)^2 \frac{h_B}{\mu_B \Delta Z^2}P_B + \frac{h_L^3 P_L}{\mu_L \Delta X^2}}{\left(\frac{D}{L}\right)^2\left[\frac{h_T^3}{\mu_T \Delta Z^2} + \frac{h_B^3}{\mu_B \Delta Z}\right] + \frac{h_R^3}{\mu_R \Delta X^2} + \frac{h_L^3}{\mu_L \Delta X^2}} \quad (13)$$

For a journal bearing, it may be assumed that there is no variation in film thickness along the length of the bearing in a particular radial direction and, therefore, $h_T = h_B$.

It is also assumed that viscosity of the oil is constant throughout the area of the bearing and, therefore, $$\mu_T = \mu_B = \mu_L = \mu_R = 1$$

Equation 1 may now be written:

$$P_n = A_0 + A_I P_T + A_{II} P_R + A_{III} P_B + A_{IV} P_L \quad (14)$$

where $$a_0 = \frac{6\pi(h_L - h_R)}{\Delta X k} \quad (15)$$

$$a_1 = a_{III} = \left(\frac{D}{L}\right)^2 \frac{h_T^3}{k\Delta Z^2} \quad (16)$$

$$a_{II} = \frac{h_R^3}{k\Delta X^2} \quad (17)$$

$$a_{IV} = \frac{h_L}{k\Delta X^2} \quad (18)$$

and $$k = \left(\frac{D}{L}\right)^2 \cdot \frac{2h_T^3}{\Delta Z^2} \cdot \frac{1}{\Delta X^2}(h_R^3 + h_L^3) \quad (19)$$

Equation 14 expresses the pressure at any point $P_n$ as a function of film thickness, viscosity, and the dimensionless quantity $$\left(\frac{D}{L}\right)$$

To obtain the total force on the bearing, it is necessary to solve Equation 14 for each point in the bearing and integrate the results. It is necessary first to decide on the points for which solution may be sought. Since the bearing is uniform throughout its length L, it may be assumed that the two halves along the length of the bearing are symmetrical with respect to pressure conditions and only one-half of the bearing need be investigated. Points may be chosen throughout the half to be investigated spaced $\Delta X$ apart axially of the bearing and $\Delta Z$ apart circumferentially of the bearing, as described above. Thus, for example, forty-eight points may be chosen spaced in grid or checkerboard fashion throughout the surface of the bearing half investigated and an Equation 14 written for each point.

The solution is then obtained by an iteration process. As a first step in such process, we may first assume the pressures at all of the different points $P_T$, $P_R$, $P_B$, and $P_L$ to be zero. We find then that $P_n$ has a definite value $$a_0 = \frac{6\pi(h_L - h_R)}{\Delta X k}$$

which we can plot at $a_0$ on the graph shown in Fig. 7. The curve in Fig. 7 is plotted between pressures as ordinates and number of iterations as abscissa.

Then with this new pressure $a_0$ at every point, we calculate a new $P_n$ which may be plotted at point 45, for example. By repeating this process a curve, such as that shown in Fig. 7, may be plotted which has an asymptote or final constant value as represented by the right hand portion 46 of the curve. When such an asymptote is reached for all the points, the Reynolds' equation for each point is satisfied and we then know the pressure at each point.

Actually this iteration may be carried out by hand, but more practically it is carried out by use of a digital computer such as the machine commonly known on the market as the IBM 650 or IBM 704.

Having found the pressure on the bearing at all points on its surface, the resultant force on the bearing; i.e., the total load W, is readily found. This load W may be expressed as follows:

$$W_{vert.} = \sum_0^m P_n \cos\theta_n (\Delta Z)(\Delta X) \quad (20)$$

The horizontal component of this load may be expressed:

$$W_{hor.} = \sum_0^m P_n \sin\theta_n (\Delta Z)(\Delta X) \quad (21)$$

where $m$ is the number of points investigated and $\theta$ is the radial angle between the vertical and the particular point.

For equilibrium, the horizontal component of force as expressed by Equation 21 should be zero. Different values of $\alpha$ in Equation 2 must be chosen by trial and error until a value of $P_n$ is found which equates Equation 21 to zero. This value of $\alpha$ establishes the attitude angle for stable operation. Having the load W and the attitude angle $\alpha$, it is then possible to obtain the radial component of force $F_R$ and tangential component of force $F_T$ as represented in Figs. 3, 4 and 5.

The design of the bearing should be such that the radial component $F_R$ is maximum.

In the design of a particular bearing of elliptical form, such as that shown in Fig. 3, after making the pressure determinations as described, a groove may be assumed at a particular location which may be considered to have the possibility of reducing the tendency to whirl. This is done by assuming zero pressure along the axial length of the assumed groove. This, therefore, imposes a new boundary condition on the analysis. With the new boundary condition, the pressure calculations are repeated for each point and the load W and attitude angle are found again. This load is then resolved into its radial and tangential components $F_R$ and $F_T$. Then by shifting the location of the groove, or the axis of the bearing, it is possible to shift the eccentricity locus and vary the radial and tangential components of force. By calculations such as these, it is easily shown that in a properly grooved bearing for the same total load, the radial component of force $F_R$ may be maximized. Grooving, properly located, increases $F_R$ and reduces $F_T$. This is desirable because the threshold whirl frequency is dependent on the slope of the radial component of force. This is a spring force and for maximum range of stability the bearing should have maximum stiffness of the spring. This spring constant may be determined as explained by reference to Fig. 8 below.

Another important feature resulting from grooving of the bearing is the shifting of the eccentricity locus as shown by curve 51 in Fig. 5 toward the vertical. Therefore, for the same eccentricity ratio $e/R-r$, the attitude angle $\alpha$ for the grooved bearing is smaller than for the ungrooved bearing. The grooved bearing thus has a larger radial component of force due to both the shift in eccentricity locus and increase in eccentricity ratio.

The relationship between the eccentricity ratio and radial component of force in a typical journal bearing is expressed by a curve, such as that shown in Fig. 8, where the curve 52 is plotted between radial component of load as ordinates and eccentricity ratio and oil thickness as abscissa. This radial component of force may be considered as a fluid spring force, the spring constant of which is determined by the differential, or slope, of this curve at the operating point; i.e., by the expression $$\frac{dF_R}{dh}$$

This slope is indicated by the line 53 in Fig. 8, which line is tangential to the curve at the operating point. If this line has insufficient slope to produce adequate spring stiffness, then another boundary condition, such as a further groove, must be chosen and the bearing recalculated until the desired spring stiffness and stability are obtained.

This spring constant which is expressed as K determines the threshold whirl frequency as shown by Equation 22

$$f=\frac{1}{\pi}\sqrt{\frac{K}{M}} \qquad (22)$$

where $f$ is the frequency of vibration, K is the fluid spring constant, and M the mass of the rotor. The relation between K and M should be such that $f$ is larger than the rotational frequency. This thus establishes a margin of safety between whirl frequency and rotational frequency or operating rate of rotation of the shaft.

In the event that the shaft has a low spring constant, then for complete anlysis the shaft flexibility must be considered. The frequency of vibration $f$ may then be calculated from the relation $$f=\frac{1}{\pi}\sqrt{\frac{kK}{M(k+K)}} \qquad (23)$$

where $k$ is the spring constant of the shaft determined by strength of materials and the other characters represent values corresponding to those in Equation 22. Here again, of course, the values for spring constant and M should be such that $f$, the threshold whirl frequency, is larger than the rotational frequency.

Of course, more than one groove may be employed. Each bearing presents its own situation which varies with load and the form and stiffness of the rotating structure as well as with the form of the bearing. In accord with my invention, in most situations one or more axial grooves may be located about the bearing so as to reduce the tangential component of force and increase the radial component sufficiently to eliminate the whirl.

In the derivations above set forth a static condition is assumed; i.e., with the shaft rotating but its axis at equilibrium. No consideration is given to the "squeeze film" effect which is present under dynamic conditions; i.e., during whirl of the shaft axis about the bearing axis. By "squeeze film" effect I refer to the force applied to the shaft as a result of the squeezing of the oil film in the bearing during whirl of the axis of the shaft about the axis of the bearing. Equation 1 may be revised accurately to take account of the "squeeze film" effect by subtracting the quantity 12V from the right hand term of the equation where V represents the rate of approach of the shaft to the bearing; i.e., the "squeeze film" velocity. The equation may then be solved in the same manner as described above. The fluid spring constant then becomes the differential, or slope, of the curve expressing the relation between the total load and film thickness and may be expressed $$\frac{dW}{dh}$$

The damping constant of the whirling motion may then be expressed by the differential $$\frac{dW}{dV}$$

What I claim as new and desire to secure by Letters Patent of the United States is:

1. An elliptical bearing for a cylindrical journal, the longer axis of the bearing extending transverse to the direction of the load on the bearing at an angle so large that one bearing sector carries substantially the entire load, said one bearing sector having a groove in the surface thereof and extending axially of the bearing in a region of high pressure due to eccentricity of the journal in rotation under load, said groove being so located that the sum of the horizontal hydrodynamic forces on the bearing is zero and the radial force in the direction of the shaft center and center of said bearing sector carrying the load is maximum.

2. An elliptical bearing for a cylindrical journal, the longer axis of the bearing extending transverse to the direction of the load on the bearing at an angle so large that one bearing sector carries substantially the entire load, said one bearing sector having a groove in the surface thereof and extending axially of the bearing in a region of high pressure due to eccentricity of the journal in rotation under load, said groove being so located that the sum of the horizontal hydrodynamic forces on the bearing is zero and the radial force in the direction of the shaft center and center of said bearing sector carrying the load is maximum and in which the differential of the said radial force as a function of film thickness is sufficiently large at the operating load on said bearing to prevent whirl.

3. An elliptical bearing for a cylindrical journal, the longer axis of the bearing extending transverse to the direction of the load on the bearing at an angle so large that one bearing sector carries substantially the entire load, said one bearing sector having a groove in the surface thereof and extending axially of the bearing in a region of high pressure due to eccentricity of the journal in rotation under load, said groove being so located that the sum of the horizontal hydrodynamic forces on the bearing is zero and the radial force in the direction of the shaft center and center of said bearing sector carrying the load is maximum and in which the radial component of force is sufficiently large that the frequency $f$ as calculated by the relation $$f=\frac{1}{\pi}\sqrt{\frac{K}{M}}$$

is higher than the rate of rotation of the journal where K is the fluid spring constant of said radial force and M is the rotating mass.

4. An elliptical bearing for a cylindrical journal, the longer axis of the bearing extending transverse to the direction of the load on the bearing at an angle so large that one bearing sector carries substantially the entire load, said one bearing sector having a groove in the surface thereof and extending axially of the bearing in a region of high pressure due to eccentricity of the journal in rotation under load, said groove being so located that the sum of the horizontal hydrodynamic forces on the bearing is zero and the radial force in the direction of the shaft center and center of said bearing sector carrying the load is maximum and in which the radial component of force is sufficiently large that the frequency $f$ as calculated by the relation $$f = \frac{1}{\pi}\sqrt{\frac{kK}{M(k+K)}}$$

is higher than the rate of rotation of the journal where K is the fluid spring constant of said radial force and $k$ is the spring constant of the journal shaft and M is the rotating mass.

5. An elliptical bearing having a load carrying elliptical sector and a second elliptical sector enclosing a horizontal shaft for rotation, means to supply lubricant between the shaft and bearing sectors, each of said sectors having its center beyond the center of the other sector and on a line forming a small acute angle with the direction of the load on said shaft and a greater acute angle with the radial component of force through the centers of said shaft and load carrying sector during operation, said first acute angle and the roating mass of the shaft having such values that said radial component of force has a spring constant of such magnitude that the whirl frequency as calculated by the relation $$f = \frac{1}{\pi}\sqrt{\frac{K}{M}}$$

is greater than the rotational speed of the shaft where $f$ is the whirl frequency, M is the rotating mass, and K is said spring constant.

6. An elliptical bearing for a horizontal cylindrical journal having two elliptical sectors each having its center beyond the center of the other sector, the axis of the ellipse being at an angle greater than ninety degrees measured from one end of said axis in the direction of rotation of the journal to the direction of the load on the journal and in operation a long converging area of high hydrodynamic pressure exists between journal and bearing extending throughout said angle and a short converging area of opposed hydrodynamic pressure measured in the direction of rotation of the journal from the opposite end of said axis to a line through the center of the journal and the center of the bearing sector opposite the load carrying sector, said angle exceeding ninety degrees by a small acute angle of such value that the rate of change in radial force ($F_R$) through the centers of the journal and load carrying sector of the bearing with change in eccentricity ratio $e/R-r$ is sufficiently large that the quantity $$\frac{1}{\pi}\sqrt{\frac{kK}{M(k+K)}}$$

is larger than the operating speed of the journal where M is the mass of the rotating body, K is the fluid spring constant, $k$ is the spring constant of the shaft, and $\pi$ is 3.1416.

7. An elliptical bearing for a cylindrical journal, said journal comprising two opposed elliptical sectors each having its center beyond the center of the other sector, the axis of the ellipse extending at an angle to the load on the journal greater than ninety degrees as measured from one end of said axis in the direction of rotation of the journal to said load and two unequal converging areas of opposed hydrodynamic forces exist between the bearing and journal in rotation, one extending throughout said angle and the other extending from the opposite end of said axis to a line through the center of the journal and the bearing sector opposite the load carrying sector, said angle being greater than ninety degrees by a small acute angle of such value that the radial force in the direction of the centers of the journal and bearing sector carrying the load is maximum and the tangential force is minimum, and the differential of said radial force as a function of film thickness is sufficiently large at the operating load on said bearing to eliminate whirl.

References Cited in the file of this patent

UNITED STATES PATENTS

| | | |
|---|---|---|
| 1,940,301 | Grobel et al. | Dec. 19, 1933 |
| 2,134,621 | Pesarese | Oct. 25, 1938 |
| 2,578,711 | Martellotti | Dec. 18, 1951 |
| 2,663,977 | Gerard et al. | Dec. 29, 1953 |